Figure 1:
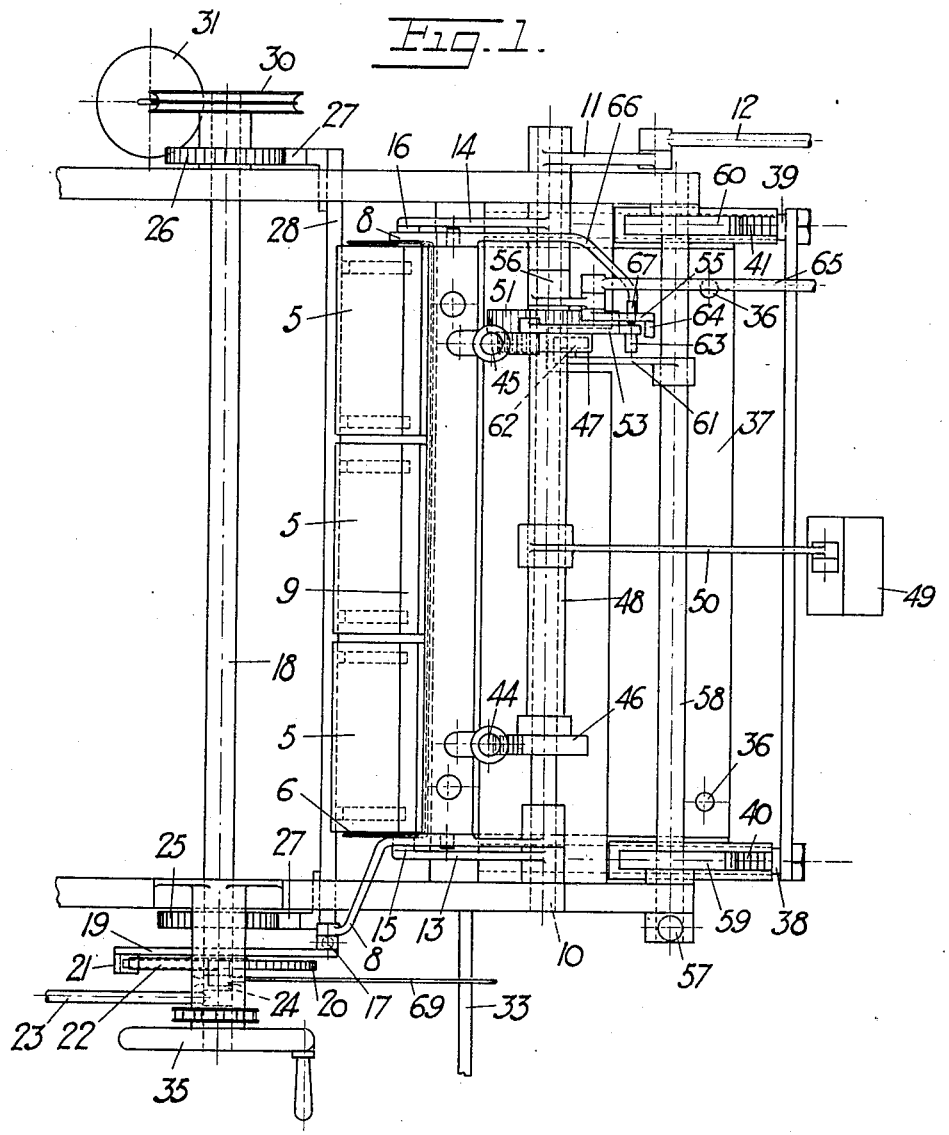

March 11, 1930.  P. W. DIETMANN  1,750,392
DEVICE FOR COLLECTING FINISHED MATCHES FROM MATCH MAKING MACHINES
Filed June 9, 1928   7 Sheets-Sheet. 1

Inventor
Paul W. Dietmann,
Atty.

March 11, 1930. P. W. DIETMANN 1,750,392
DEVICE FOR COLLECTING FINISHED MATCHES FROM MATCH MAKING MACHINES
Filed June 9, 1928 7 Sheets-Sheet. 2

Inventor.
Paul W. Dietmann,
by
atty.

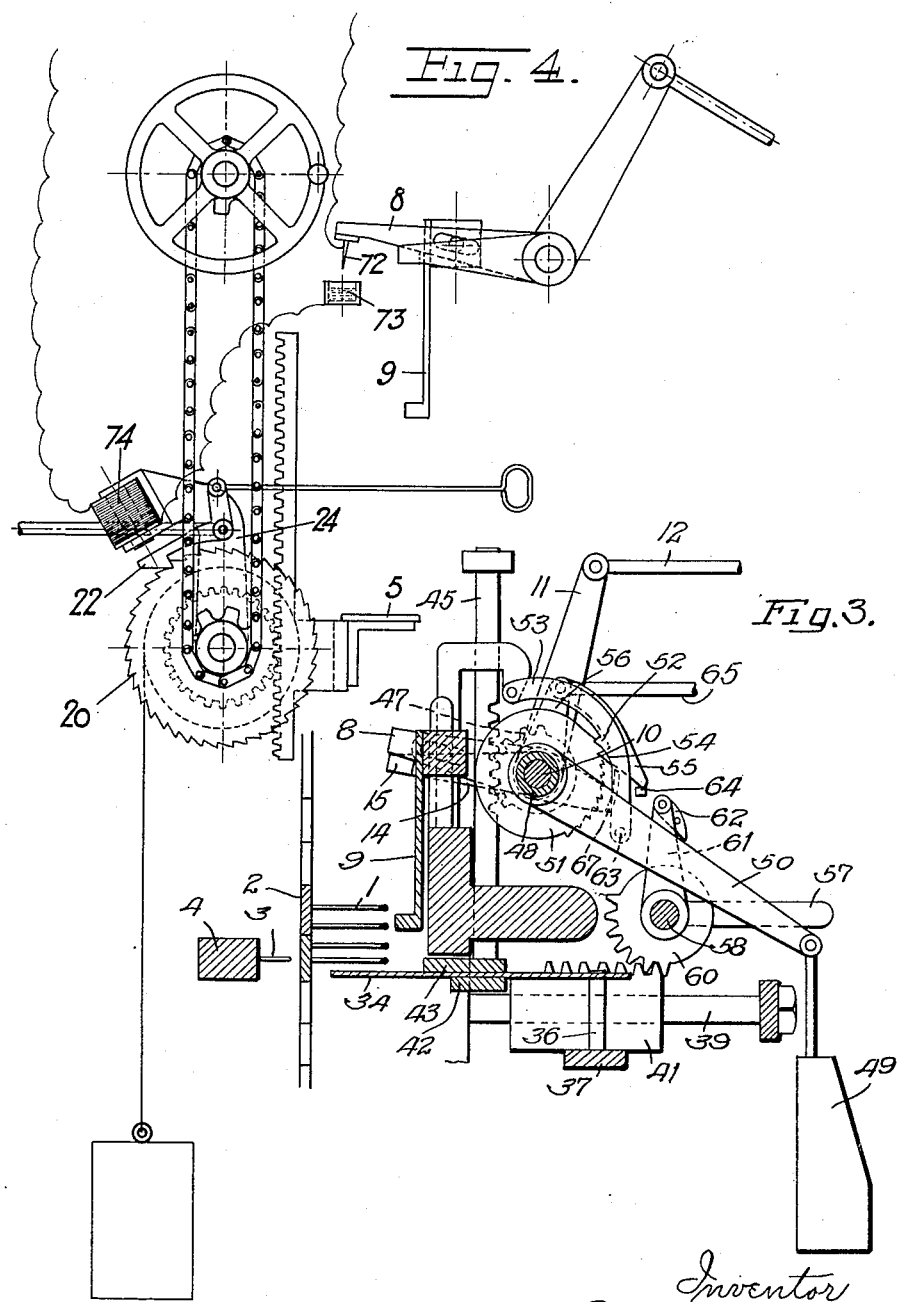

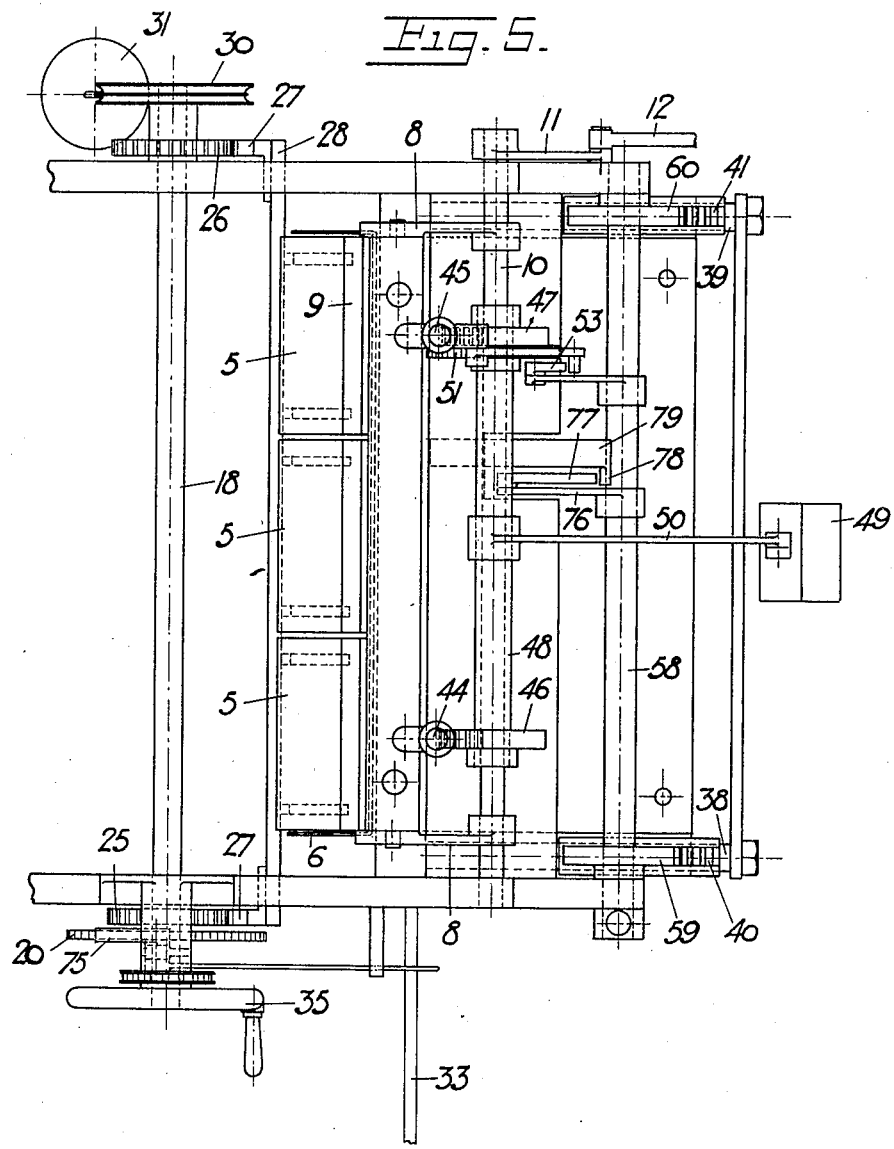

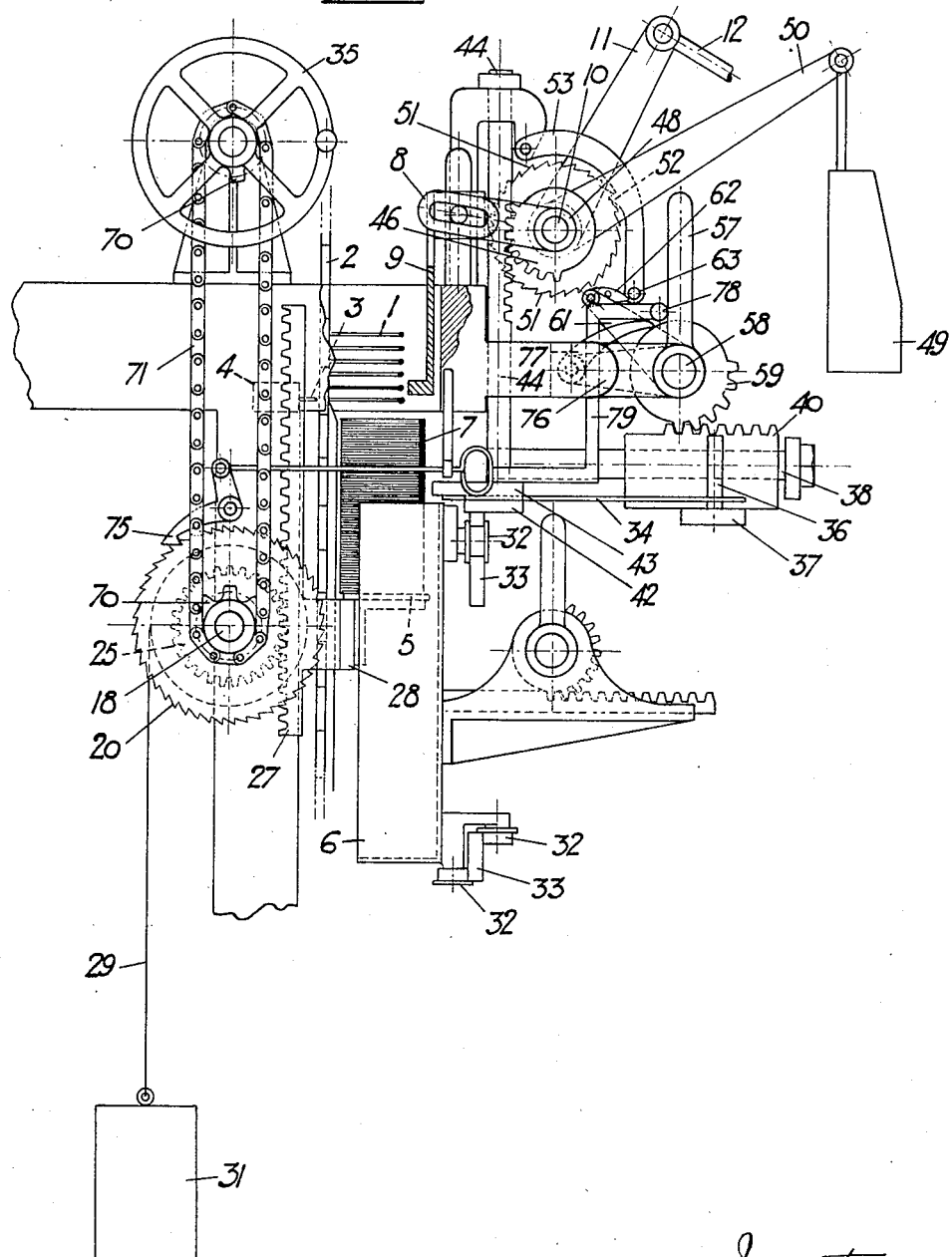

March 11, 1930. P. W. DIETMANN 1,750,392
DEVICE FOR COLLECTING FINISHED MATCHES FROM MATCH MAKING MACHINES
Filed June 9, 1928 7 Sheets-Sheet 6
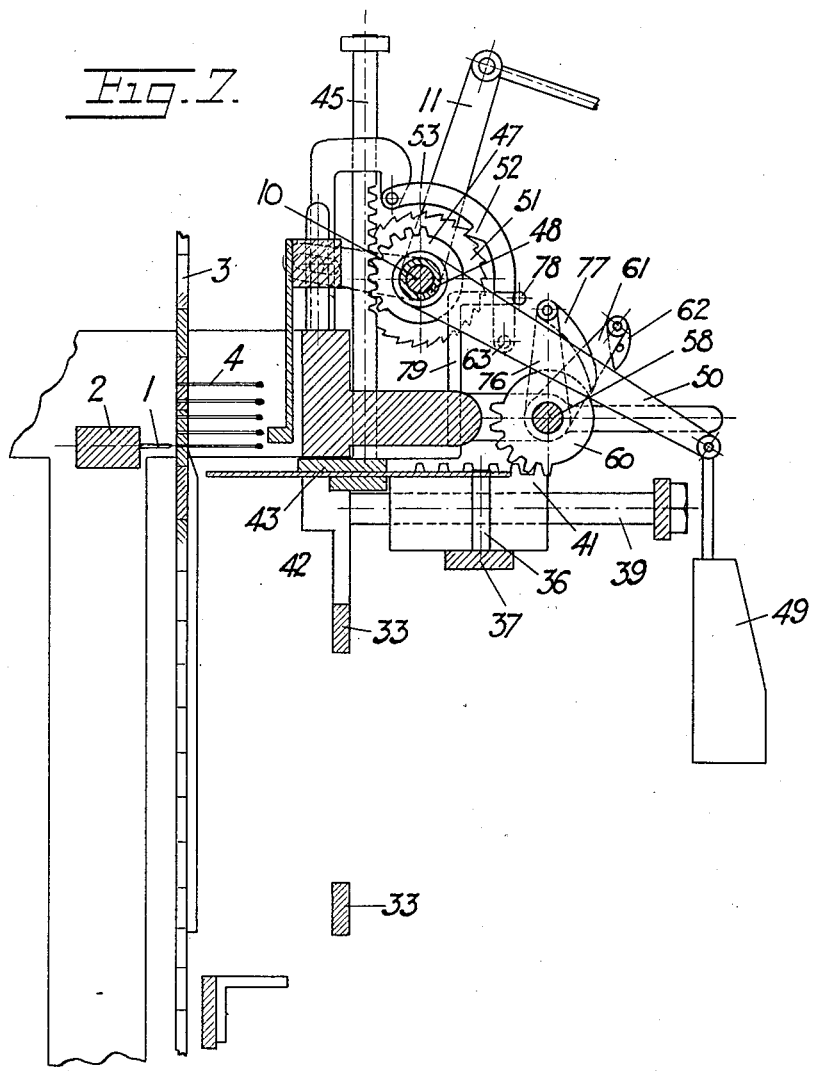
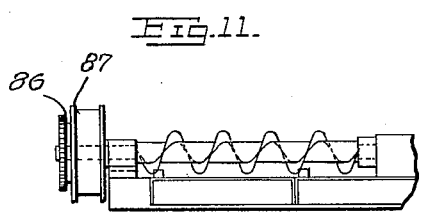

March 11, 1930.   P. W. DIETMANN   1,750,392
DEVICE FOR COLLECTING FINISHED MATCHES FROM MATCH MAKING MACHINES
Filed June 9, 1928   7 Sheets-Sheet. 7
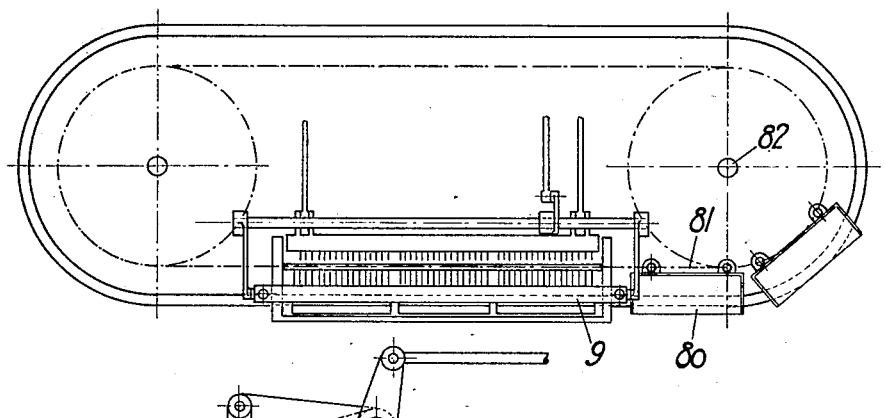
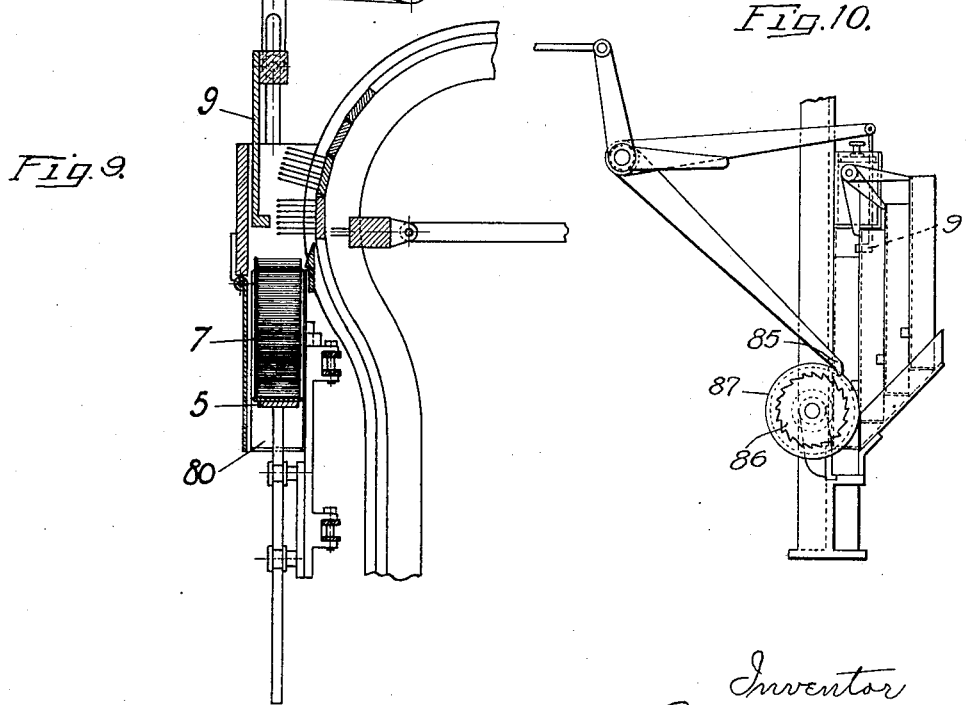

Patented Mar. 11, 1930

1,750,392

UNITED STATES PATENT OFFICE

PAUL WILHELM DIETMANN, OF JONKOPING, SWEDEN, ASSIGNOR TO AKTIEBOLAGET SIEFRERT & FORNANDER, OF KALMAR, SWEDEN

DEVICE FOR COLLECTING FINISHED MATCHES FROM MATCH-MAKING MACHINES

Application filed June 9, 1928, Serial No. 284,169, and in Sweden July 22, 1927.

This invention relates to match making machines in which the matches are put into holes in an endless chain, built up from bars or the like, to be then impregnated with paraffine, have heads put on, dried and finally ejected from the machine and collected in some kind of collecting boxes. In machines of this kind it has been found that the last operation, that is, the collecting of the matches in the collecting boxes, is the most difficult one and requires comparatively expensive and complicated mechanisms.

In all known machines of the above said type, the collection of the finished matches is carried out in the following manner: The strip supporting the finished matches passes a collecting device provided in the machine, and an ejecting device, usually comprising a reciprocating slide (needle-beam) equipped with needles, ejects the matches held by the passing bars, causing them to drop either directly down into larger containers or first upon a movable bottom which is pulled away following each ejecting operation or series of ejecting operations to allow the matches to fall down into the larger containers.

This drop of the matches, however, must not exceed one centimeter or two, as the matches will otherwise get tangled up, when falling and will lay in disorder in the containers; making the succeeding box filling operation more difficult. The containers or the like in which the matches are to be collected, should preferably have a depth of 40 to 50 cm. and in order to enable a fairly faultless collection said containers are provided with loose bottoms that can be lowered, or the containers are themselves lowered at a certain speed during the filling operation.
Yet, however, it has proved in the practice that it is impossible always to get matches having equally sized heads, even with constant thickness of the match splinters, with the result, that a certain quantity of matches will take up different space in the collecting box. Moreover, the percentage of filling of splinters in the supporting bars or in the endless supporting strips (that is the number of holes occupied by splinters as compared with the total number of holes of the strip) is variable. The volume of matches ejected per unit of time will, as a result, never be constant but varies from minute to minute. In order to eliminate this drawback adjusting devices have been provided in some types of machines by means of which the operator may manually control said lowering. Said devices, however, always require an uninterrupted attention from the part of the operator, involving a constant moment of risk during the run of the machine.

The object of this invention is to provide a device whereby to entirely eliminate the necessity of any such adjustment of the lowering of the bottoms or containers as well as the need of any adjustment even in case matches of different sizes are to be manufactured in the same machine.

The invention is characterized, chiefly, by a feeling device, which controls a mechanism to effect the lowering of the piles of matches within the containers, said feeling device during the course of the collecting operation being brought into contact with the top surface of the collected matches at certain intervals in order that the variation of the level of said top surface may be maintained within definite limits independently of the thickness of the matches and the percentage of filling as well.

This invention can be applied to any type of collecting device hitherto known as, for instance, to such in which the container is kept stationary during the collecting operation, as well as to such in which the containers simultaneously with the lowering of their bottoms are moved laterally past the collecting position. In said last mentioned case it is preferably this lateral motion, that is controlled by the feeling device.

Several embodiments of the invention are illustrated in the drawings. Fig. 1 is a plan view and Fig. 2 a side elevation of one embodiment. Fig. 3 is a vertical section of part of said embodiment. Fig. 4 is a side elevation of a modification of the embodiment according to Figs. 1–3. Figs. 5–7 show views corresponding to those, shown in Figs. 1–3, of another embodiment.

Fig. 8 is a side elevation and Fig. 9 is a detail cross section on a larger scale of a device, embodying the invention, applied to a machine having a laterally movable collecting box.

Figs. 10 and 11 are detail views showing one embodiment of the invention applied to another type of machine having laterally movable collecting boxes.

The various embodiments of the invention may best be understood from a description of their operation.

Figure 2:
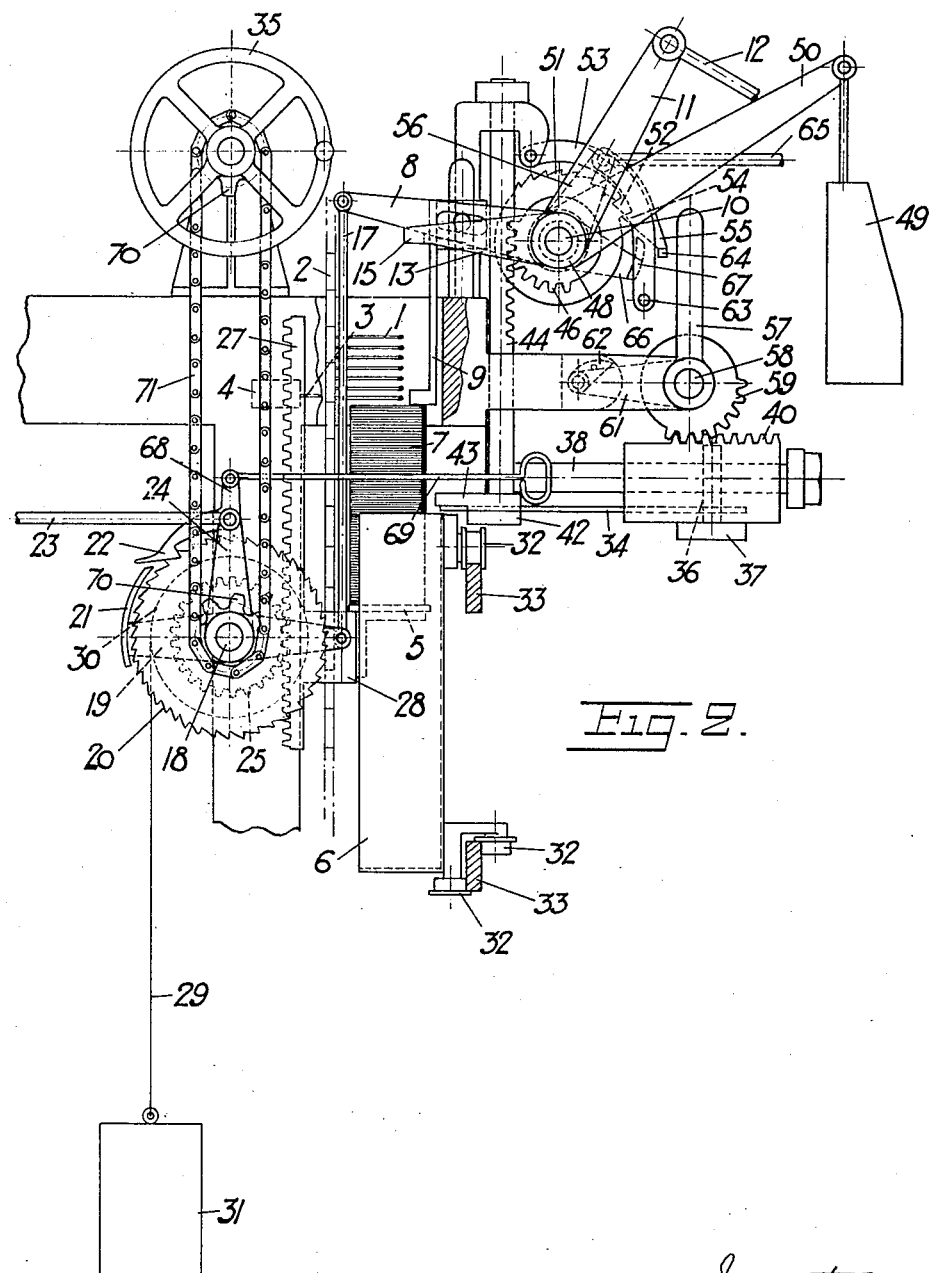

In the embodiment shown in Figs. 1–3, the matches are collected in containers stationary during the collecting operation which, when filled, are removed from the collecting position and emptied and then restored to the filling position or replaced by empty containers. The matches pushed out in the meantime are received by a collecting plate temporarily moved into the collecting position, which after the new containers are placed in position is pulled out again permitting the matches, collected on the plate, to drop down into the collecting boxes. In such cases, however, where the collecting boxes are moved laterally past the collecting position during the collecting operation said plate is not required. In all of the embodiments, shown in the drawings, the matches are supported by loose bottoms which are lowered during the collecting period; it is to be noted, however, that the invention may equally well be used in cases where the whole collecting boxes are lowered, as in the Swedish Patent No. 25354 or the German Patent No. 269.063.

In the embodiment shown in Figs. 1–3 the finished matches 1 fitted in rows of holes in bars 2, are moved past the collecting device. By means of needles 3 carried by a reciprocating needle beam 4 one or more rows of finished matches 1, thus supported by the bars 2, are ejected at each ejecting stroke. The matches ejected drop down into collecting boxes 6 equipped with bottoms 5 which can be raised and lowered, accumulating therein to a pile 7 of finished matches which will gradually fill the boxes 6 according as the loose bottoms 5 are lowered.

The lowering of the loose bottoms 5 in accordance with the variation of the level of the top surface of the matches received is carried out in the following manner: A member 9, carried by two levers 8 which is movable up and down is brought into gentle contact with the top surface of the pile of matches during its downward movement thereby adjusting itself to a level corresponding to the volume of the matches last ejected. The levers 8 are pivoted to the shaft 10. Rigidly secured to the shaft 10 is a lever 11, moved back and forth by the link 12, and levers 13 and 14, engaging by their curved ends under the levers 8 to support same. It is thus seen that when the measuring member 9 on its downward motion is stopped by the pile of matches 7, the levers 13 and 14 may continue their downward movement to then reverse their movement and in moving upward to bring the feeling or measuring member 9 with them. One of the levers 8 is extended and connected by a link 17 to a rocking arm 19, rotatably mounted on the shaft 18, which at one end supports a curved plate 21, partly covering a ratchet wheel 20 attached to the shaft 18. According as the feeling member 9 stops in a lower or higher lever, the cover plate 21 will stop higher or lower, respectively, uncovering a smaller or greater number of teeth as counted from the pawl 22. The pawl 22 is secured to a lever 24 pivoted on the shaft 18 which is reciprocated by power derived from the machine through the link 23. Keyed to said shaft 18 are two toothed gears 25 and 26. Said toothed gears mesh in suitably guided racks 27 movable up and down, which are connected together by means of a cross-piece 28, supporting the loose bottoms 5. The link 23 moved back and forth from the machine consequently performs the lowering of the loose bottoms 5 through the intermedium of the pawl 22 and the ratchet wheel 20. The pawl 22 commences its driving motion to the right in Fig. 2 at the same moment that the feeling member 9 is stopped by the pile of matches 7 and, as the position of the cover plate 21 determines the angle, through which the ratchet wheel 20 will be rotated, the position of the feeling member will also determine the lowering of the loose bottoms 5. The higher the pile of matches 7 is reaching, the more must the pile be lowered and the more teeth must be exposed to the pawl 22, as will also be the case, because the highest position of the member 9 corresponds to the lowermost position of the cover plate 21.

By means of a rope 29 secured to a rope pulley 30 and a counter-weight 31, the racks 27, the cross-piece 28, the loose bottoms 5 and the pile of matches 7 are counterbalanced. For the same purpose a light friction brake may be provided at a suitable point to stabilize the system. After the collecting boxes 6 have been successively filled during the gradual lowering of the loose bottoms, they have to be removed and emptied or replaced by other empty containers. To this end the collecting boxes of this embodiment are arranged in a row comprising three boxes the total width of which corresponds to the width of the collecting position, said boxes being built together to form a single car which by the rollers 32 runs on two supporting rails 33, leading from the collecting position to the outside of the machine. When said car, made up from the three collecting boxes, is filled with finished matches, it is pulled aside to be emptied. To enable this other means must be provided to receive those matches ejected during the period of time during which the collecting boxes are out of the collecting position. Said means comprises the collecting plate 34. After the pile of matches 7 has been rapidly lowered manually by turning the hand wheel 35, geared to the shaft 18 through the chain transmission 70—71, so that the member supporting the loose bottoms 5 has come below the lower edge of the container or containers, bringing the top of the pile of matches somewhat below the level of the collecting plate 34, said plate is moved inwards and at the same time upwards from the normal position, shown in Fig. 2, to the working position, shown in Fig. 3. The movement of the collecting plate from the former to the latter position is carried out by hand and at the same time a driving mechanism is put in action to successively lower the plate proportionally to the raising of the level of the top surface of the match pile due to the matches last ejected.

Said mechanism is of the following design and operation. The plate 34 may move vertically on two bolts 35, 36, secured to the beam 37. Said beam connects two racks 40, 41 horizontally sliding on two guiding bolts 38, 39. The collecting plate 34 is also guided and supported by two guide plates 42 and 43, secured to the vertically reciprocating racks 44 and 45. Said racks mesh in two toothed segments 46 and 47, which are secured to a sleeve 48 rotatably mounted on the shaft 10 and carrying a lever 50 loaded by a counter weight 49. To said sleeve there is also attached a ratchet segment 51 engaged by a tooth 52 of a pawl 53 pivoted to the frame of the machine and also by a tooth 54 of pawl 55, pivoted to a lever 56 rotatably mounted on the shaft 10. As long as said teeth 52 and 54 engage in the ratchet segment 51 any rotation of the sleeve 48 with the parts secured thereto to the right in Fig. 2 cannot take place, and, consequently, no raising of the racks 44 and 45 supporting the plate 34. On the contrary, the plate can be moved towards the collecting position by pushing a lever 57 fixed to the shaft 58 to the right in Fig. 2. By means of toothed segments 59 and 60, attached to the shaft 58 which mesh in the racks 40 and 41 the plate 34 is moved to the left in Fig. 2.

On the shaft 58 there is also attached a lever 61 carrying a pawl 62. Upon the rotation of the shaft 58 to the right in Fig. 2 the pawl 62 engages below a pin 63 secured to the pawl 53, thereby releasing the tooth 52 from the ratchet segment. Simultaneously, the tooth 54 of the pawl 55 is released by the fact that a shoulder 64 of the pawl 55 will be operated by the back of the pawl 53 when the latter is moved outwards by the ratchet pawl 62 in the above described manner. The locking of the sleeve 48 against rotation to the right in Fig. 2 will thus cease, allowing the plate 34 to be lifted to its working position, as shown in Fig. 3, under the action of the counter weight 49 through the intermedium of the toothed segments 46 and 47 and the racks 44 and 45.

In this position, see Fig. 3, the pin 63 of the pawl 53 has slipped past the pawl 62 and the pawl 53 has fallen back into its starting position, causing the tooth 52 to mesh in the ratchet segment 51, thereby preventing further rotation of the sleeve 48 to the right in Fig. 3. The pawl 55 has also returned to its starting position, in which the tooth 54 engages the ratchet segment. The lever 56 which is reciprocated from the machine by means of the link 65 will now move the plate 34 downwards by means of the pawl 55 and the ratchet segment 51 in the same way as described in connection with the loose bottoms.

The number of teeth the ratchet segment shall be moved at each time is controlled by the feeling member 9 in the following way: Connected to one of the levers 8 is a lever 66 carrying a cover plate 67 which uncovers a number of teeth of the segment 51 which increases according as the feeling member 9 stops higher up. The pawl 55 slides on the top of this cover plate before the feed motion begins, the amount of feeding being thus controlled by the different positions of the cover plate 67 in proportion to the volume of the matches last ejected.

When the plate has been moved down in this way and has reached its lowermost position, carrying a pile of matches, the containers 6 must be emptied and again placed in position and the loose bottoms raised to their uppermost position close beneath the plate 34. This is performed in the following manner: The handle of a link 69 connected to an arm 68 vertically projecting from the pawl 22 (Fig. 2), is moved by hand to the right in Fig. 2 releasing the pawl 22 from the ratchet wheel 20, allowing the latter to be rotated by means of the hand wheel 35 and the chain transmission 70, 71 in the opposite direction to the feeding direction of the pawl thus raising the loose bottoms. The operator now grasps the lever 57 moving it upwards and to the left, Fig. 3, thereby pulling the plate 34 out to the right so that the pile of matches will drop to be immediately taken up by the loose bottoms. During this motion the pawl 62 slides over the pin 63 and returns to its position, shown in Fig. 2. The loose bottoms are moved down from their uppermost position in the same way as previously described.

Fig. 4 illustrates an example of electrical connection between the feeling member 9 and the pawl 22. In case the feeling member 9 has stopped in too low a position and the pile of matches consequently is too low, the motion of the loose bottoms should be left off during one revolution of the machine. When this is to take place is determined by a contact point 72 which dips into a mercury container 73, thereby closing an electric circuit through the electromagnet 74, attached to the movable arm 24 supporting the pawl 22. The electromagnet thereby attracts the pawl 22 preventing it from engaging into the ratchet wheel 20 until the arm 8 has moved upwards again and the circuit is broken.

It is evident that the relation between the position of the feeling member at the measuring moment and the greater or smaller movement of the member, that effects the increase of volume in the collecting boxes, can be varied in a great number of ways without departing from the principle of the invention, and the devices shown are to be considered as mere examples only.

In the embodiment shown in Figs. 5–7 the feeling member itself directly controls the increase of volume. This embodiment is a simplification of that shown in Figs. 1–3, and is in the first place adapted for matches which can withstand a somewhat higher pressure on their heads.

This embodiment can be derived from that previously described by the following changes: The levers 8 are secured to the shaft 10, whereas the levers 13 and 14, the link 17, the levers 19 and 24, the movable pawl 22 and the link 23 are removed. The feeling member 9 due to its being positively connected to the reciprocating arm 11 will always move down to the same position pressing on the pile of matches 7 which in turn by the bottoms 5, that may be lowered, the cross piece 28, the racks 27, and the gears 25–26 overcomes the reaction from the weight 31, causing the shaft 18 to rotate. The ratchet wheel 20 in this case has another function than before, because it cooperates with a pawl 75, fixed in the frame to prevent the weight 31 from rotating the system in the opposite direction.

In this embodiment the lowering of the collecting plate 34 in accordance with the increase in height of the pile of matches ejected is also controlled directly by the feeling member 9. This will make those parts used for lowering the sliding plate, as described in the previous embodiment, illustrated in Figs. 1–3, viz. the link 65, the lever 56, the pawl 55, the lever 66, and the cover plate unnecessary. In order to raise the collecting plate 34 the following elements are added, viz: a lever 76, provided with a pawl 77, which is fixed to the shaft 58, and a double curved projection 79, provided with a pin 78, which is attached to the guide plate 43 to which also the racks 44 and 45 are secured. When, for the purpose of moving the collecting plate, the lever 57 is turned to the right, Fig. 6, and the pawl 53 is released from the ratchet segment 51, the pawl 77 will engage below the pin 78 raising the projection 79 together with the racks 44 and 45 and the collecting plate 34 up to the working position of the latter, as shown in Fig. 7.

Figs. 8 and 9 illustrate the application of the invention in case the collecting boxes are moved laterally past the collecting device, while their bottoms are guided, as by an inclined surface to be thus uniformly lowered (see German Patent No. 366,233).

The feeling member 9 is lowered following each ejecting operation in the same way as in the embodiment shown in Figs. 1–3 to touch the pile of matches 7 (Fig. 9). The collecting boxes 80 are supported by an endless chain 81 and receive their motion from the shaft 82, the rotation of which is controlled by the feeling member 9 through similar means as those used for controlling the lowering of the bottoms in the embodiment, shown in Figs. 1–3. The downward motion of the bottoms 5 is proportional to said rotation and, as a result, the feeling member will also in this case control the lowering of the bottoms in accordance with the volume of matches ejected.

Instead of having the feeling member directly control the rate of feed motion as effected by a pawl or the like the lowering of the collecting boxes or their loose bottoms may take place continuously according to a predetermined maximum rate of feed motion, whereupon the feeling member is caused to effect a more or less long or a more or less frequently repeated disconnection of the driving mechanism according to the different height of the pile of matches at the measuring moment. Such a device is shown in Fig. 10 in connection with a feeding device of the type shown in the German Patent No. 354.555. The lateral feed motion of the collecting boxes is here carried out by means of a screw, Fig. 11, driven by a belt and a belt pulley 87. The feeling member 9 in this case descends to measure the height of the pile of matches (Fig. 10), at the same time lowering a pawl 85 which, should the pile of matches be too low, strikes a tooth of a ratchet wheel 86 connected to the screw, thereby preventing the screw from turning during a certain period. In the meantime the belt slides on the pulley 87, which drives the screw, or there may be a frictional clutch inserted between the screw and the pulley, which slides when a certain predetermined load is exceeded. When the measuring member moves upwards again the locking member follows, causing the screw to continue its movement.

It is evident, that the invention can be varied in many other ways without departing from its idea.

What I claim is:

1. In an automatic match making machine having an endless splint carrier to support rows of splints in spaced relation to each other and means for ejecting the finished matches directly into collecting boxes to collect them into piles, the combination with vertically movable pile supports in said boxes, of a mechanism to lower said supports, a feeling member to control the operation of said mechanism, and means to move said feeling member down into contact with the top surface of said piles at intervals and let it come to stop when touching said top surface, thereby to regulate the lowering of said supports so as automatically to maintain the variation of the level of said top surface within definite limits irrespective of the thickness and percentage of filling of the matches.

2. In an automatic match making machine having an endless splint carrier constructed to support rows of splints in spaced relation to each other and means for ejecting the finished matches directly into collecting boxes to collect them into piles, the combination of vertically movable pile supports in said boxes, a feeling member up and down above said piles, means to lower said feeling member at intervals to bring it into contact with the top surface of said piles and let it come to stop when touching said top surface and then again lifting it out of contact therewith, separately driven means to lower said pile supports at corresponding intervals, and means controlled by said feeling member to regulate the operation of said separately driven means to allow them to lower the pile supports a distance corresponding to the increase of the height of the piles during the last interval.

3. In an automatic match making machine having an endless splint carrier constructed to support rows of splints in spaced relation to each other and means for ejecting the finished matches directly into collecting boxes, removable for emptying, the combination of a sliding plate to be brought into position to receive the matches ejected during the period of removal of said boxes, a feeling member, means to bring said feeling member into contact with the top surface of the matches collected upon said plates at intervals and let it come to stop when touching said top surface and then again lifting it out of contact therewith, and means controlled by said feeling member to lower said sliding plate after each ejecting operation a distance corresponding to the height of the volume of matches last ejected.

4. In an automatic match making machine having an endless splint carrier constructed to each other and means for ejecting the finished matches directly into collecting boxes adapted to be removed for emptying when filled, the combination with vertically movable match supports in said boxes, of a mechanism to lower said supports at intervals, a feeling member, means to bring said feeling member into loose contact with the top surface of the piles at corresponding intervals, means controlled by said feeling member to regulate the operation of said mechanism in conformity with the position of said feeling member, a sliding plate to receive the matches ejected during the period of removal of the collecting boxes, and means controlled by said feeling member to lower said sliding plate after each ejecting operation a distance corresponding to the height of the volume of matches last ejected.

5. In an automatic match making machine having an endless splint carrier constructed to support rows of splints in spaced relation to each other and means for ejecting the finished matches directly into collecting boxes to collect them into piles, the combination of vertically movable pile supports in said boxes, a feeling member movable up and down in a straight-lined path above the headed ends of the matches collected in said boxes, means to bring said feeling member into contact with the headed ends of the matches at the top of said piles at intervals and cause it to depress the piles a distance corresponding to the increase of the height of the piles as effected during the last interval.

In testimony whereof I have signed my name.

PAUL WILHELM DIETMANN.